(12) United States Patent
Nishida et al.

(10) Patent No.: US 9,261,413 B2
(45) Date of Patent: Feb. 16, 2016

(54) CLIP FOR ATTACHING BATTERY TEMPERATURE SENSOR

(75) Inventors: Ryuhei Nishida, Yokohama (JP); Naoyuki Masuda, Utsunomiya (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 406 days.

(21) Appl. No.: 13/981,810

(22) PCT Filed: Jan. 24, 2012

(86) PCT No.: PCT/JP2012/051472
§ 371 (c)(1),
(2), (4) Date: Sep. 5, 2013

(87) PCT Pub. No.: WO2012/102279
PCT Pub. Date: Aug. 2, 2012

(65) Prior Publication Data
US 2014/0010266 A1     Jan. 9, 2014

(30) Foreign Application Priority Data
Jan. 28, 2011   (JP) .................................. 2011-017182

(51) Int. Cl.
*G01K 1/14* (2006.01)

(52) U.S. Cl.
CPC .............. *G01K 1/14* (2013.01); *G01K 2205/00* (2013.01); *H01M 2200/10* (2013.01); *H01M 2220/20* (2013.01)

(58) Field of Classification Search
CPC .............. G01K 1/14; G01K 1/08; G01K 1/16; G01K 1/00
USPC .................. 374/100, 208, 163, 185, 179, 141; 73/866.5; 420/62, 90
See application file for complete search history.

(56) References Cited

U.S. PATENT DOCUMENTS

| | | | | |
|---|---|---|---|---|
| 5,829,880 A | * | 11/1998 | Diedrich ................ | G01K 13/02 285/93 |
| 5,945,606 A | * | 8/1999 | Tokunaga ............... | B60C 23/04 374/E1.018 |
| 6,610,439 B1 | * | 8/2003 | Kimoto ................... | H01M 2/00 374/208 |
| 7,004,042 B2 | * | 2/2006 | Grundmann ........... | G01K 13/02 374/208 |
| 7,004,623 B2 | * | 2/2006 | Nakagawa ............... | G01K 1/08 136/200 |
| 7,553,079 B1 | * | 6/2009 | Khan ....................... | G01K 1/14 374/148 |

(Continued)

FOREIGN PATENT DOCUMENTS

JP   H10-302847 A   11/1998
JP   2006-250763 A   9/2006

(Continued)

*Primary Examiner* — Gail Kaplan Verbitsky
(74) *Attorney, Agent, or Firm* — Manabu Kanesaka (57) ABSTRACT

A clip includes an abutting portion abutting against an outer surface of a case; an insertion hole to which a sensor main body can be inserted; a holding tube through which the sensor main body can pass, and can internally hold an overhanging portion; a leg tube which can be inserted into an attachment hole; and elastic claws sandwiching the case between the abutting portion and the elastic claws. In the abutting portion, at least a pair of ribs is provided, which is positioned respectively in both end portions in a diametrical direction of the abutting portion; protrudes toward the outer surface of the case; and applies a force to the holding tube in a direction bending the abutting portion and narrowing an open end surface when the case is sandwiched between the pair of elastic claws and the ribs.

4 Claims, 8 Drawing Sheets

(56) References Cited

U.S. PATENT DOCUMENTS

| | | | |
|---|---|---|---|
| 8,177,179 B2 * | 5/2012 | Bard | G01K 1/14 24/457 |
| 2005/0155442 A1 | 7/2005 | Grundmann | |
| 2006/0103346 A1 | 5/2006 | Misu et al. | |
| 2009/0185597 A1 * | 7/2009 | Khan | G01K 1/14 374/208 |
| 2010/0067563 A1 * | 3/2010 | Wang | H04B 1/7097 375/144 |
| 2010/0285340 A1 | 11/2010 | Matsunaga | |
| 2012/0031517 A1 * | 2/2012 | Yoshida | G01K 1/14 138/103 |
| 2014/0233606 A1 * | 8/2014 | Nishida | G01K 1/14 374/208 |

FOREIGN PATENT DOCUMENTS

| | | |
|---|---|---|
| JP | 4025218 B2 | 10/2007 |
| JP | 2010-281787 A | 12/2010 |
| WO | 2010/143729 A1 | 12/2010 |

* cited by examiner

CLIP FOR ATTACHING BATTERY TEMPERATURE SENSOR

RELATED APPLICATIONS

The present application is National Phase of International Application No. PCT/JP2012/051472 filed Jan. 24, 2012, and claims priority from Japanese Application No. 2011-017182, filed Jan. 28, 2011.

FIELD OF TECHNOLOGY

The present invention relates to a clip for attaching a battery temperature sensor, and by preventing a temperature sensor from falling out or moving, or from wobbling, the present invention improves and maintains an attachment accuracy.

BACKGROUND ART

Conventionally, there is known a battery structure of an electric car provided with a temperature sensor unit (for example, see paragraph [0034], FIG. 1, and FIGS. 6 to 8 of Patent Document 1).

The conventional temperature sensor unit is composed of a cylindrical unit main body including a screw portion screwed and fixed in a sensor attachment hole on an upper wall of a battery case; a synthetic resinous temperature detection portion slidably disposed on an inner side thereof; a temperature sensor disposed inside an end portion of the temperature detection portion; and a spring elastically installed inside the unit main body and urging the temperature detection portion in a direction protruding the temperature detection portion from the unit main body (for example, see the paragraph [0034] of the Patent Document 1).

Incidentally, although it is not the temperature sensor directly attached to the battery case of an automobile, there is conventionally known an attachment structure for a temperature sensor (see paragraph [0001] and FIGS. 1 to 3 of Patent Document 2) used for an outside temperature sensor and the like; an attachment structure for a temperature sensor (see paragraph [0001] and FIGS. 1 to 3 of Patent Document 3) attached to a blower air duct; or an attachment holder for a temperature sensor (see paragraph [0015] and FIGS. 1 to 5 of Patent Document 4) attached to a holding plate of a battery.

PRIOR ART DOCUMENT

Patent Document

Patent Document 1: Japanese Unexamined Patent Publication No. H10-302847
Patent Document 2: Japanese Unexamined Patent Publication No. 2006-250763
Patent Document 3: Japanese Unexamined Patent Publication No. 2010-281787
Patent Document 4: Japanese Patent No. 4025218

DISCLOSURE OF THE INVENTION

Problems to be Solved by the Invention

The temperature sensor unit with the aforementioned conventional battery structure of the electric car, however, has a problem of being screwed in the sensor attachment hole so as to need a tool at an attachment time, or a problem that an attachment is troublesome and requires time.

Also, since the attachment accuracy is required for the temperature sensor of the battery, the aforementioned conventional temperature sensor unit urges the temperature detection portion in the protruding direction using the spring. Thus, the conventional temperature sensor unit has a problem of having a large number of components and a complicated structure.

Therefore, the present invention is made in view of the problems that the aforementioned conventional technology has, and an object of the present invention is not only providing a simplified structure so as to be easily placed, but also preventing the temperature sensor from falling out or moving, or from wobbling, to improve and maintain the attachment accuracy.

Means for Solving the Problems

The present invention is made in order to obtain the aforementioned object, and has the following characteristics.

First, the present invention is a clip for attaching a battery temperature sensor which holds a temperature sensor including a sensor main body and an overhanging portion overhanging from a circumference of a base end portion of the sensor main body; is attached to an attachment hole passing in and out of a case housing a battery; and allows an end portion of the sensor main body to protrude into the case.

Secondly, the clip comprises the following configuration.

(1) Abutting Portion

An abutting portion has a diameter larger than that of the attachment hole, and abuts against an outer surface of the case.

(2) Insertion Hole

An insertion hole passes through the abutting portion, and has a diameter smaller than that of the overhanging portion, and the sensor main body can pass through the insertion hole.

(3) Holding Tube

A holding tube is communicated with the insertion hole; extends in a tube shape toward an outside of the case from the abutting portion; and opens at an end surface so as to insert the sensor main body to pass through the insertion hole from the open end surface. Also, the holding tube can hold the overhanging portion internally.

(4) Leg Tube

A leg tube is communicated with the insertion hole; extends in a tube shape toward an inside of the case from the abutting portion; and opens at an end so as to insert the sensor main body to pass through an end opening from the insertion hole. Also, the leg tube can be inserted into the attachment hole.

(5) Elastic Claws

Elastic claws have at least a pair, and elastically protrude from an outside surface of the leg tube. When the elastic claws pass through the attachment hole, the elastic claws are bent toward a tube inner portion of the leg tube, and after passing through the attachment hole, the elastic claws restore to its original state so as to sandwich the case between the abutting portion and the elastic claws.

Thirdly, in the abutting portion, there is provided at least a pair of ribs respectively positioned in both end portions in a diametrical direction of the abutting portion; protruding toward the outer surface of the case; and applying a force to the holding tube in a direction bending the abutting portion and narrowing the open end surface when the case is sandwiched between a pair of the elastic claws and the ribs.

The present invention may have the following characteristic.

Namely, in the holding tube, there is provided at least a pair of slits opening in a direction orthogonal to an opposed direction of a pair of the ribs, and extending up to a middle toward the holding tube from the open end surface. According to the embodiment, by providing the pair of slits, the abutting portion and the holding tube can be easily bent.

The present invention may have the following characteristic.

Namely, on an inner circumferential surface of the holding tube, there is provided an internal projection protruding toward a tube inner portion of the holding tube, and extending along an insertion direction of the temperature sensor. According to the embodiment, the internal projection is provided so as to prevent a wobbling of the temperature sensor in the tube inner portion of the holding tube.

The present invention may have the following characteristic.

Namely, on an inner circumferential surface of the holding tube, there are provided locking portions positioned in a middle in the insertion direction of the temperature sensor; protruding toward the tube inner portion of the holding tube; abutting against an outside surface of the overhanging portion; elastically bending in a direction expanding a diameter of the holding tube by being pressed against the outside surface; and restoring to its original state after the outside surface has passed through so as to sandwich the overhanging portion between the abutting portion positioned at a bottom of the holding tube and the locking portions. According to the embodiment, the locking portions are provided so as to prevent the temperature sensor in the tube inner portion of the holding tube from falling out, or to allow an installation time of the temperature sensor to be moderate.

Effect of the Invention

The present invention has the aforementioned configuration, so that not only the present invention has a simplified structure so as to be easily placed, but also by preventing the temperature sensor from falling out or moving, or from wobbling, an attachment accuracy can be improved and maintained.

BEST MODES OF CARRYING OUT THE INVENTION

Figure 1:
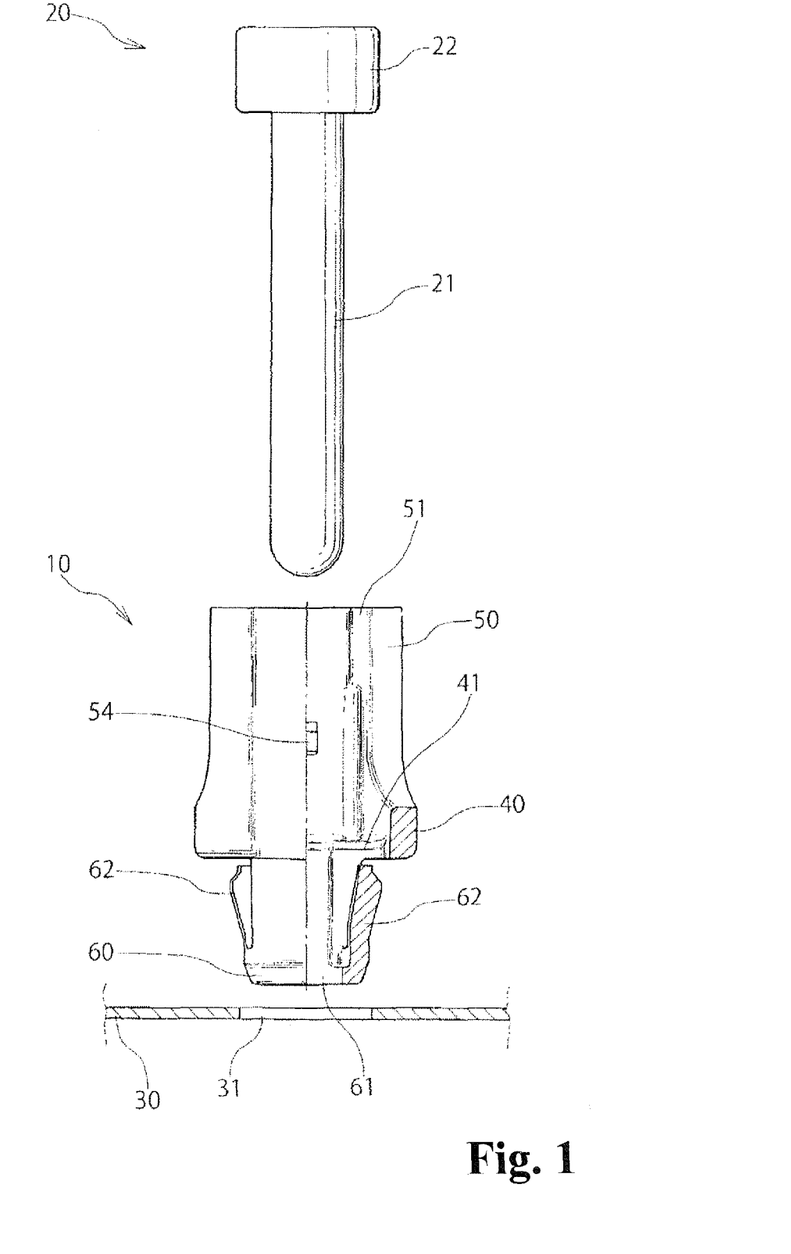
FIG. 1 is a cross-sectional view, wherein a clip, a temperature sensor, and one portion of a panel in one embodiment of the present invention are shown in a cross-sectional view thereof.
Figure 2:
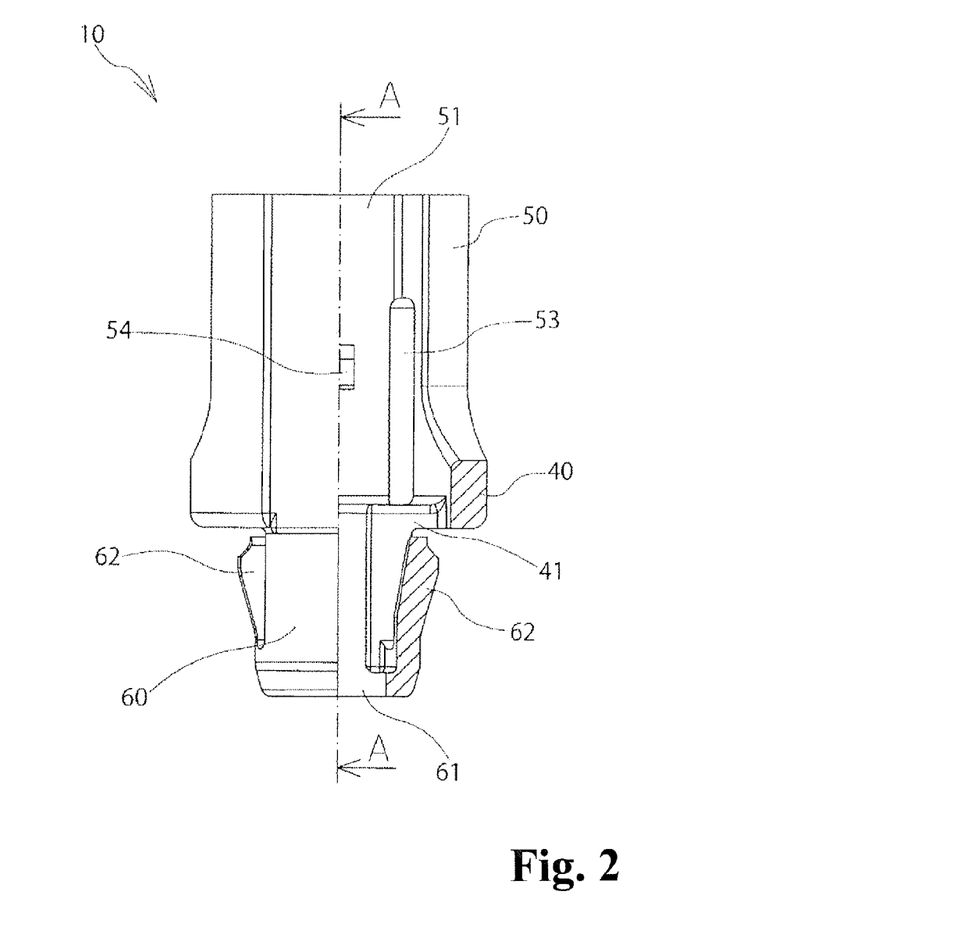
FIG. 2 is a front view of the clip, wherein a half thereof is shown in a cross-sectional view thereof.
Figure 8:
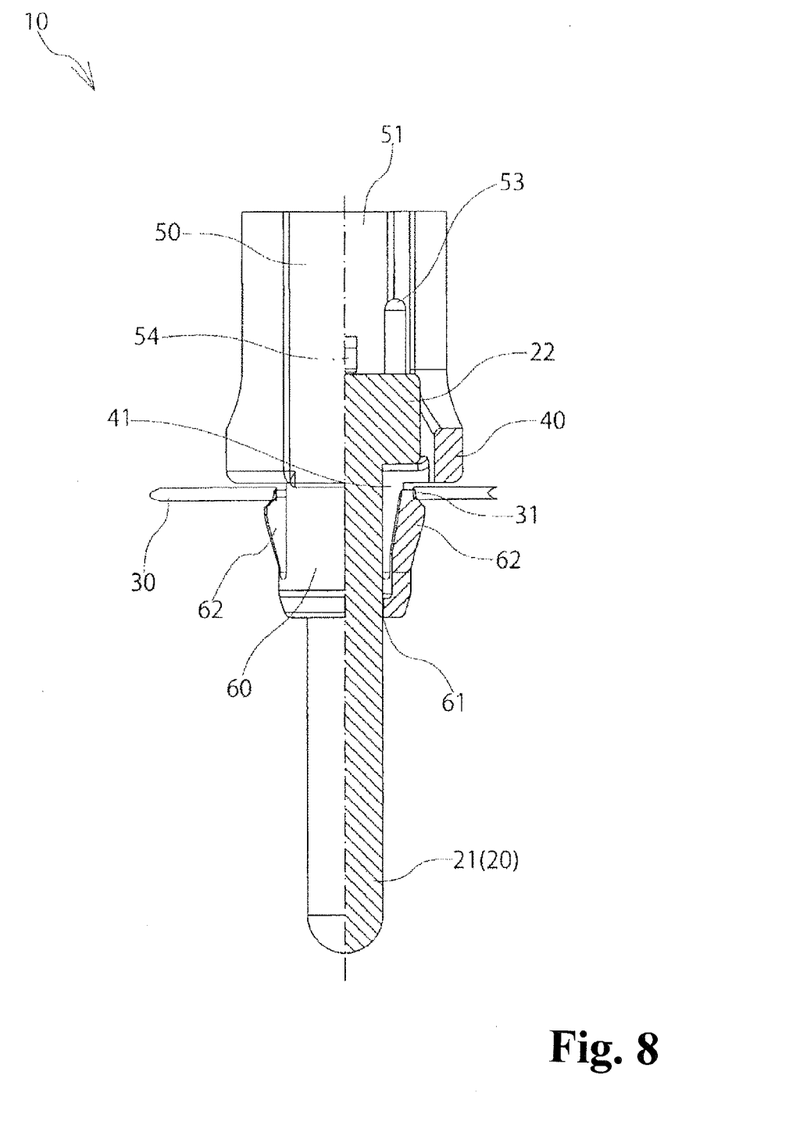
FIG. 8 is a cross-sectional view showing an attachment state of the clip, wherein the half thereof is shown in a cross-sectional view thereof.

In figures, the reference numeral 10 represents a clip, and as shown in FIG. 1 and FIG. 8, the clip 10 holds a temperature sensor 20, and is attached to an attachment hole 31 which is passed in and out of a case 30 housing a battery (not shown in the figures).

Although it is not shown in the figures, the battery is used for an electric car or a hybrid car, and is configured as a module in which cells are laminated. Although it is not shown in the figures, the battery is mounted on a vehicle in a state housed inside the case 30. The battery produces heat by an internal electrochemical reaction, and a temperature thereof is raised. When the temperature becomes high, a power generation efficiency of the battery decreases, so that the battery is housed inside the case 30 having a high heat transfer, and is cooled by blowing a cooled wind from an outside. In order to control the blowing of the cooled wind, the temperature inside the case 30 is measured by the temperature sensor 20.

As shown in FIG. 1, in the case 30, there is provided the circular attachment hole 31 penetrating in and out of the case 30 on an upper wall thereof.

Although it is not shown in the figure, inside the temperature sensor 20, there is embedded a thermistor element. As shown in FIG. 1, the temperature sensor 20 includes a sensor main body 21 and an overhanging portion 22.

Although it is not shown in the figure, the thermistor element is embedded in the sensor main body 21, and the sensor main body 21 is formed in a cylindrical shape, and an end portion is rounded to have a semispherical form in a test tube shape. The overhanging portion 22 is overhung approximately in a doughnut shape from a circumference of a base end portion of the sensor main body 21, and an outer diameter thereof is formed larger than an outer diameter of the sensor main body 21.

The clip 10 is integrally molded by a thermoplastic synthetic resin having an appropriate amount of elasticity and rigidity, for example, POM (polyacetal).

As shown in FIG. 1, the clip 10 roughly comprises the following respective portions.

Incidentally, the following (1) to (3) will be described later.

(1) Abutting portion 40
(2) Holding tube 50
(3) Leg tube 60

Incidentally, each portion of the clip 10 is not limited to the aforementioned (1) to (3).

(Abutting Portion 40)

As shown in FIG. 1 and FIG. 8, the abutting portion 40 has a diameter larger than the attachment hole 31, abuts against an outer surface of the case 30, and is formed approximately in a disc shape.

As shown in FIG. 1, FIG. 3, FIG. 5, FIG. 6, and FIG. 8, the abutting portion 40 roughly comprises the following respective portions.

Incidentally, the following (1) and (2) will be described later.

(1) Insertion hole 41
(2) Ribs 42

Incidentally, each portion of the abutting portion 40 is not limited to the aforementioned (1) and (2).

(Holding Tube 50)

As shown in FIG. 1 and FIG. 8, in the holding tube 50, a lower surface is communicated with the insertion hole 41, and the holding tube 50 extends in a tube shape toward an outside of the case 30 from the abutting portion 40, for example, approximately in a cylindrical shape passed through up and down. An end surface, i.e., an upper surface of the holding tube 50 opens approximately in a circle so as to insert the sensor main body 21 to pass through the insertion hole 41 from the open end surface 51, and the holding tube 50 can internally hold the overhanging portion 22.

Figure 3:
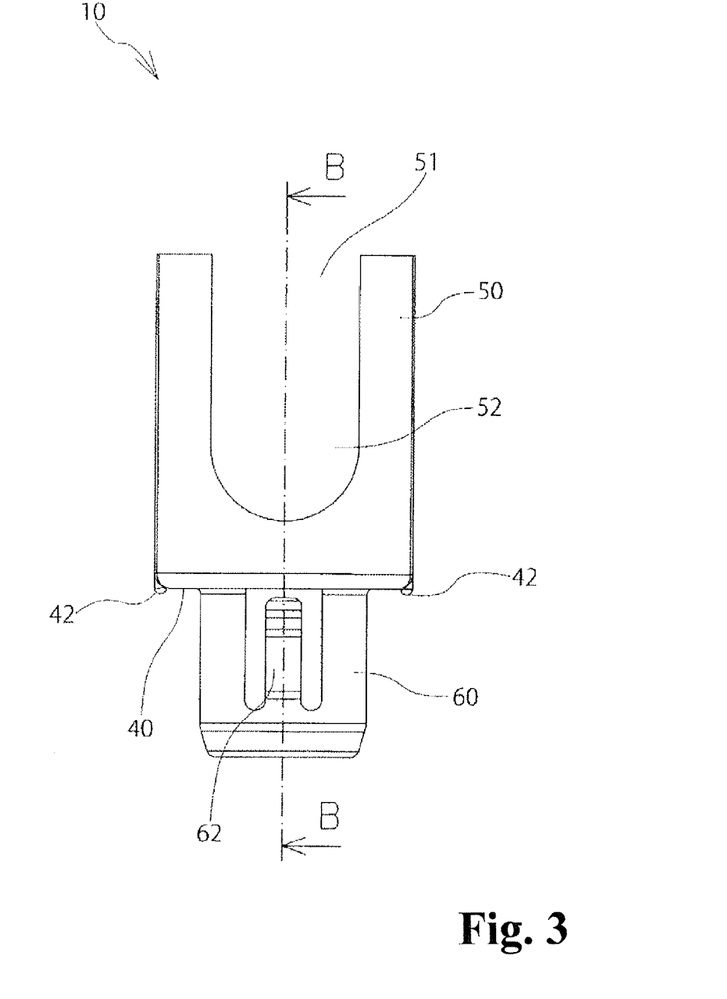
FIG. 3 is a side view of the clip.
Figure 4:
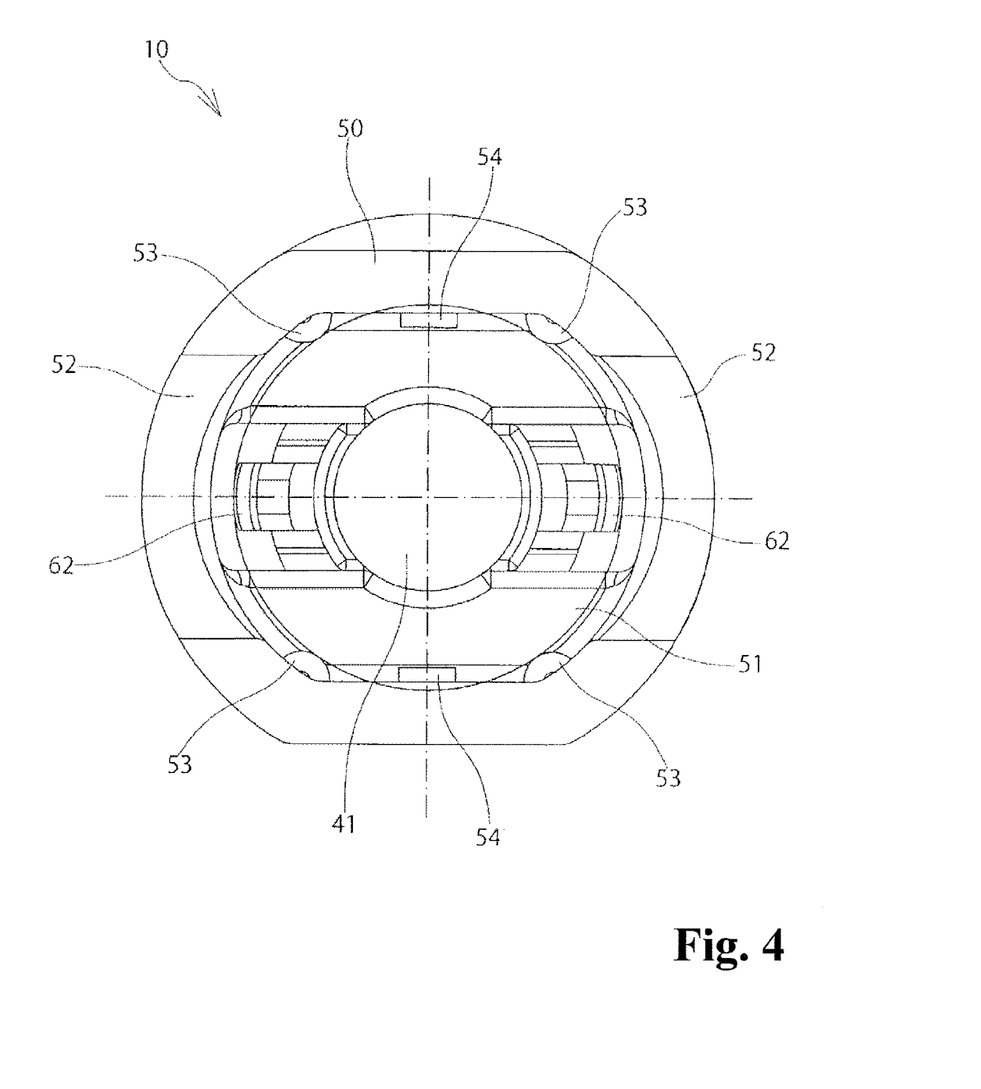
FIG. 4 is a plan view of the clip.
Figure 6:
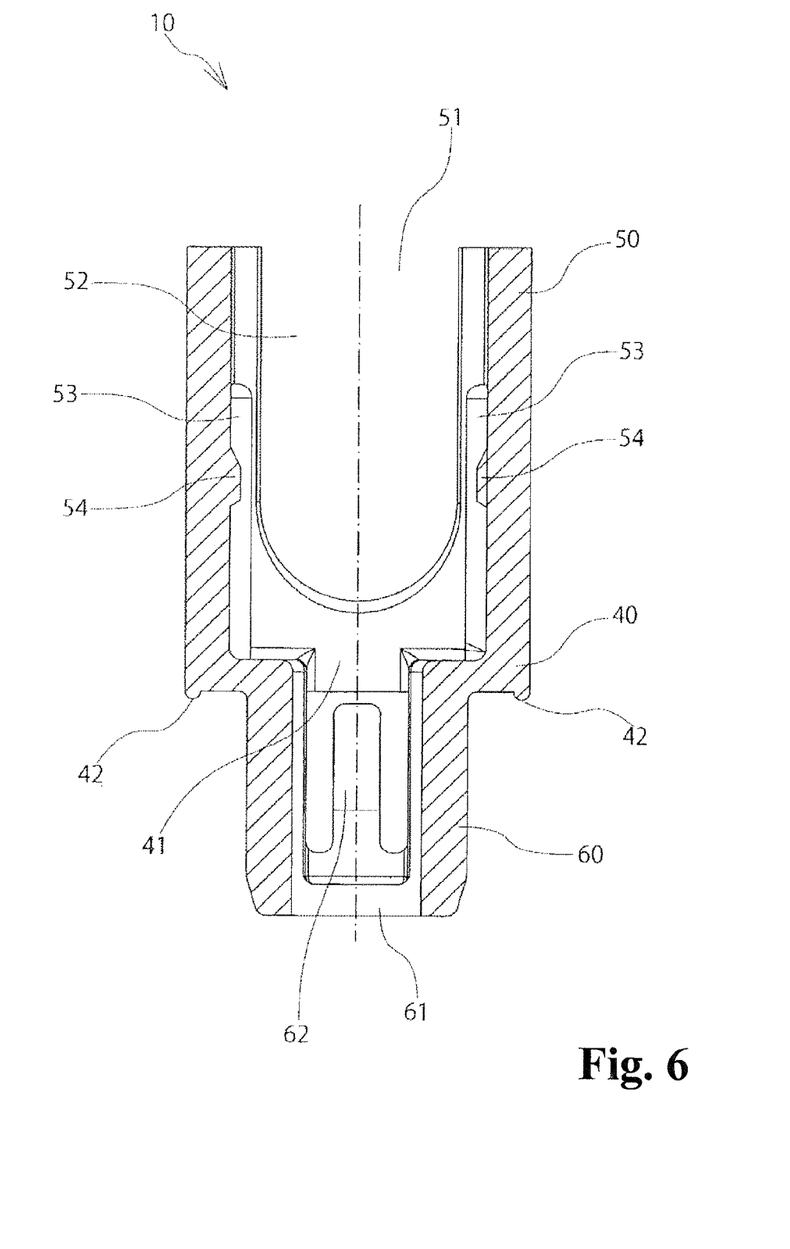
FIG. 6 is a cross-sectional view taken along a line A-A in FIG. 2.

In addition to the aforementioned open end surface 51, as shown in FIG. 3, FIG. 4, and FIG. 6, the holding tube 50 roughly comprises the following respective portions.

Incidentally, the following (1) to (3) will be described later.
(1) Slits 52
(2) Internal projections 53
(3) Locking portions 54

Incidentally, each portion of the holding tube 50 is not limited to the aforementioned (1) to (3).

(Leg Tube 60)

As shown in FIG. 1 and FIG. 8, in the leg tube 60, an upper surface is communicated with the insertion hole 41, and the leg tube 60 extends in a tube shape toward an inside of the case 30 from the abutting portion 40, for example, approximately in a cylindrical shape which is slightly smaller than the holding tube 50 and is passed through up and down. An end, i.e., a lower surface of the leg tube 60 opens approximately in a circle so as to insert the sensor main body 21 to pass through an end opening 61 from the insertion hole 41. Also, the leg tube 60 can be inserted into the attachment hole 31.

In addition to the aforementioned end opening 61, as shown in FIG. 1 and FIG. 8, the leg tube 60 roughly comprises the following respective portions.

(1) Elastic claws 62

As shown in FIG. 1 and FIG. 8, elastic claws 62 have at least a pair, for example, two pieces, elastically protrude from an outside surface of the leg tube 60, and when the elastic claws 62 pass through the attachment hole 31, the elastic claws 62 are bent toward a tube inner portion of the leg tube 60. After the elastic claws 62 have passed through the attachment hole 31, the elastic claws 62 restore to its original state so as to sandwich the case 30 between the abutting portion 40 and the elastic claws 62.

Figure 5:
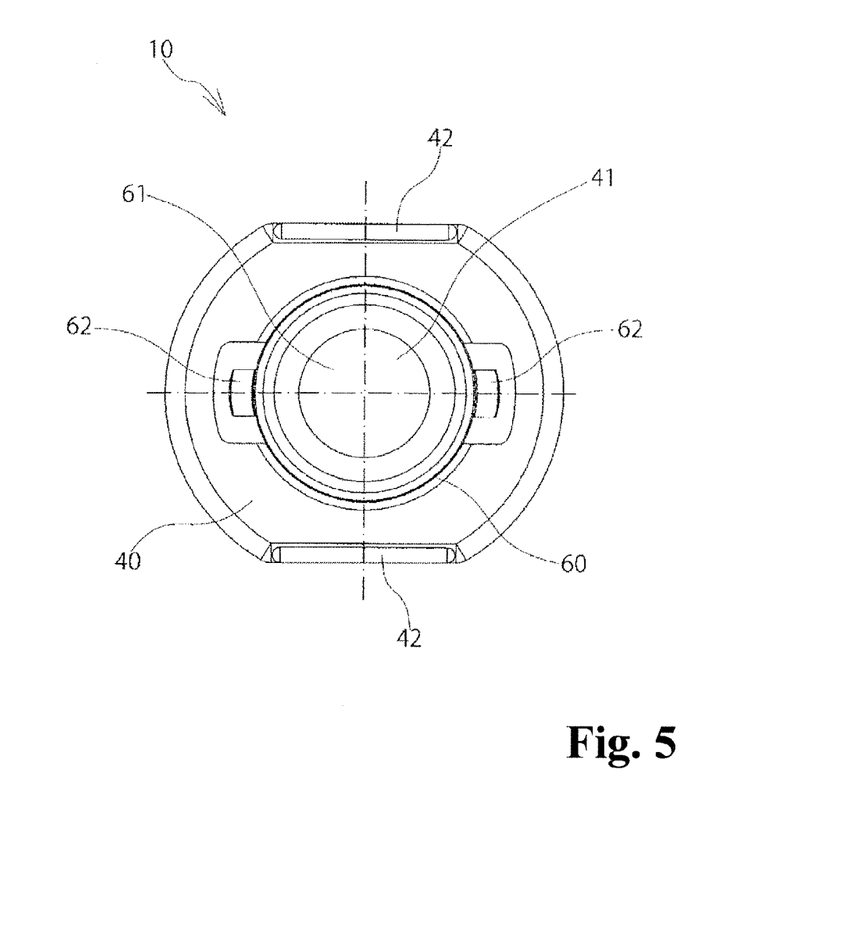
FIG. 5 is a bottom view of the clip.
Figure 7:
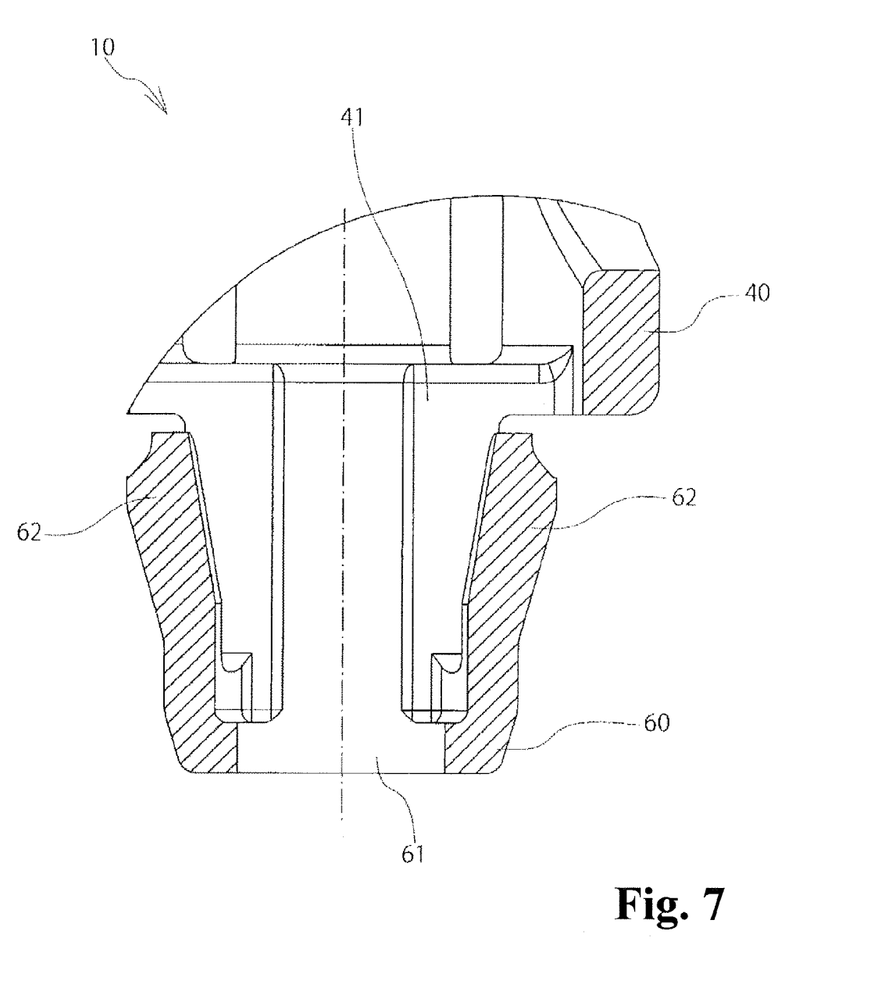
FIG. 7 is a partial cross-sectional view taken along a line B-B in FIG. 3.

As shown in FIG. 5, two elastic claws 62 are oppositely positioned in a direction orthogonal to the later-mentioned two ribs 42. As shown in FIG. 3, a cross-sectional surface of the elastic claw 62, which passes through in and out of the leg tube 60, is positioned on an inner side surrounded by approximately a channel-like notch. Also, an upper end portion of the elastic claw 62 is a free end, and a lower end portion of the elastic claw 62 becomes a hinge so as to be connected to the leg tube 60. As shown in FIG. 7, an outside surface of the elastic claw 62 is inclined at a slant in such a way that an outer diameter of the leg tube 60 gradually decreases toward a lower end portion from an upper end portion.

Incidentally, as for the number of the elastic claws 62, two pieces are illustrated as an example. However, the number of the elastic claws 62 is not limited to the above, and although it is not shown in the figures, the elastic claws with three pieces or above may be formed in a radial manner.

(Insertion Hole 41)

As shown in FIG. 1 and FIG. 8, the insertion hole 41 roundly passes through the abutting portion 40 in an up-and-down direction, and has a diameter smaller than that of the overhanging portion 22 so as to insert the sensor main body 21.

(Ribs 42)

As shown in FIG. 3, FIG. 5, and FIG. 6, the ribs 42 are formed with at least a pair, for example, two pieces, and are respectively positioned in both end portions in a diametrical direction of the abutting portion 40. Also, the ribs 42 protrude toward the outer surface of the case 30, and applies a force to the holding tube 50 in a direction bending the abutting portion 40 and narrowing the open end surface 51 of the holding tube 50 when the case 30 is sandwiched between the pair of elastic claws 62 of the leg tube 60 and the ribs 42.

As shown in FIG. 5, two ribs 42 are oppositely positioned in a direction orthogonal to the pair of elastic claws 62 of the holding tube 50, and are mutually formed in parallel. The ribs 42 extend long in a direction wherein the pair of elastic claws 62 is opposed in a linear manner. Also, as shown in FIG. 3 and FIG. 6, a cross-sectional surface of the rib 42 is formed in a semicircle.

Incidentally, although two pieces are illustrated as an example of the number of the ribs 42, it is not limited to the above, and although it is not shown in the figures, short ribs with three pieces or above may be formed.

(Slits 52)

As shown in FIG. 3, FIG. 4, and FIG. 6, the slits 52 are formed with at least a pair, for example, two pieces; open in a direction orthogonal to an opposed direction of the pair of ribs 42; and extend halfway toward the holding tube 50 from the open end surface 51.

The slits 52 pass through in and out of the holding tube 50, and are formed approximately in a U shape whose upper surface is open.

Incidentally, although the number of the slits 52 is illustrated as an example of two pieces, it is not limited to the above, and the slits 52 may be formed with three or above.

(Internal Projections 53)

As shown in FIG. 4 and FIG. 6, the internal projections 53 are positioned on an inner circumferential surface of the holding tube 50, protrude toward a tube inner portion of the holding tube 50, and extend along an insertion direction of the temperature sensor 20.

As shown in FIG. 4, the internal projections 53 are formed with a plurality of numbers, for example, four pieces in a radial manner with a central focus on the insertion hole 41, and a cross-sectional surface of the internal projections 53 is formed approximately in a semicircle. The overhanging portion 22 of the temperature sensor 20 can pass through an inside of a space surrounded by four internal projections 53, and the internal projections 53 slidingly contact an outer circumferential surface of the overhanging portion 22.

Incidentally, as for the number of the internal projections 53, four pieces are illustrated as an example. However, the number of the internal projections 53 is not limited to the above, and may be single, two, three, or five or above.

(Locking Portions 54)

As shown in FIG. 4 and FIG. 6, the locking portions 54 are positioned on an inner circumferential surface of the holding tube 50; are positioned in a middle in the insertion direction of the temperature sensor 20; protrude toward the tube inner portion of the holding tube 50; abut against an outside surface of the overhanging portion 22; and elastically bend in a direction expanding a diameter of the holding tube 50 by being pressed against the outside surface. After the outside surface of the overhanging portion 22 has passed, the locking portions restore to its original state so as to sandwich the overhanging portion 22 between the abutting portion 40 positioned at a bottom of the holding tube 50 and the locking portions 54.

As shown in FIG. 4, the locking portions 54 are formed with at least a pair, for example, two pieces. Two locking portions 54 are opposed in a direction orthogonal to an opposed direction of two slits 52. As shown in FIG. 6, in the locking portions 54, a cross-sectional surface, downwardly inclining a topside surface facing the open end surface 51 toward the center of the tube, is formed approximately in a trapezoidal shape. A downside surface of the locking portions 54 becomes a steep slope face orthogonal to the insertion direction of the temperature sensor 20, and an interval between the abutting portion 40 positioned at the bottom of the holding tube 50 approximately corresponds to a top-to-bottom height of the overhanging portion 22 of the temperature sensor 20.

(Usage Method of Clip 10)

Next, an attachment method of the clip 10 comprising the aforementioned configuration will be explained.

Namely, as shown in FIG. 8, the temperature sensor 20 is installed in the clip 10, and after that, the clip 10 is attached to the attachment hole 31 of the case 30.

First, as shown in FIG. 1 and FIG. 8, an end portion of the sensor main body 21 is inserted in accordance with the open end surface 51 of the holding tube 50.

When the sensor main body 21 is inserted, the sensor main body 21 moves to the insertion hole 41 of the abutting portion 40 through the tube inner portion of the holding tube 50. Furthermore, when the sensor main body 21 is inserted, the sensor main body 21 proceeds to the tube inner portion of the leg tube 60 from the insertion hole 41, and through the end opening 61 thereof, as shown in FIG. 8, the end portion of the sensor main body 21 protrudes outward.

On the other hand, the overhanging portion 22 of the temperature sensor 20 also proceeds to the tube inner portion of the holding tube 50 from the open end surface 51. When the overhanging portion 22 proceeds to the tube inner portion, the outer circumferential surface thereof slidingly contacts the internal projections 53 protruding to the tube inner portion. Moreover, when the overhanging portion 22 proceeds, the outer circumferential surface thereof abuts against the locking portions 54 protruding to the tube inner portion.

Here, when the temperature sensor 20 is strongly pushed in, the locking portions 54 are pressed by the outer circumferential surface of the overhanging portion 22, a groove width of the slits 52 is spread, and an inner diameter of the holding tube 50 is expanded. Thus, the overhanging portion 22 proceeds toward the bottom of the holding tube 50 in such a way that the overhanging portion 22 pushes out an interval of the two locking portions 54. When the overhanging portion 22 passes inside the interval of the two locking portions 54, due to a resin elastic restoring force, the inner diameter of the holding tube 50 reduces, and as shown in FIG. 8, the overhanging portion 22 is sandwiched between the two locking portions 54 and the abutting portion 40 positioned at the bottom of the holding tube 50.

Thus, by the two locking portions 54, the overhanging portion 22 is blocked from falling out of the open end surface 51 of the holding tube 50, and the temperature sensor 20 is held in the clip 10.

Next, as shown in FIG. 1 and FIG. 8, the leg tube 60 of the clip 10 is inserted in accordance with the attachment hole 31 of the case 30.

When the leg tube 60 is inserted, the two elastic claws 62 abut against an inner edge of the attachment hole 31. Here, when the leg tube 60 is strongly pushed in, the two elastic claws 62 are pressed against the inner edge of the attachment hole 31, and are bent in a direction approaching each other. When the two elastic claws 62 pass the attachment hole 31, by the resin elastic restoring force, the two elastic claws 62 spread, and as shown in FIG. 8, the two elastic claws 62 elastically sandwich the case 30 between a bottom surface of the abutting portion 40 and the two elastic claws 62 from inner and outer directions thereof.

At that time, the two elastic claws 62 do not completely restore to its original state, and due to a stored elastic force, there generates a force attempting to draw the leg tube 60 into a back of the attachment hole 31, i.e., the inside of the case 30.

On the other hand, the two ribs 42 protruding from the bottom surface of the abutting portion 40 abut against a surface of the case 30.

The two ribs 42 are spaced from an outer circumferential edge portion of the abutting portion 40 and face each other, so that due to the force attempting to draw the leg tube 60 into the inside of the case 30, an inner circumferential edge portion of the abutting portion 40 approaches the surface of the case 30, and the abutting portion 40 bends and curves.

When the abutting portion 40 bends and curves, the groove width of the two slits 52, which are positioned to be orthogonal to the two ribs 42, is narrowed, and the inner diameter of the holding tube 50 are reduced. The groove width of the two slits 52 becomes approximately an inverted V shape whose groove width gradually narrows toward an open end surface 51 side positioned on an upper side.

Thus, a force is applied to narrow an opposed interval of the two locking portions 54 of the tube inner portion so as to block the temperature sensor 20 from moving in the insertion direction, or to block the temperature sensor 20 from falling out of the case 30.

Therefore, as shown in FIG. 8, not only the end portion of the sensor main body 21 protruding to the inside of the case 30 can be accurately positioned inside the case 30 through the end opening 61 of the leg tube 60 so as to improve an attachment accuracy thereof, but also the relevant condition can be maintained for a prolonged period.

Incidentally, when the temperature sensor 20 has broken down, the whole clip 10 may be exchanged, or the temperature sensor 20 may be exchanged by removing the temperature sensor 20 from the clip 10.

The specification, claims, drawings, and abstract of Japanese Patent Application No. 2011-017182 filed on Jan. 28, 2011 are cited in their entireties herein and are incorporated as a disclosure of the specification of the present invention.

What is claimed is:

1. A clip for attaching a battery temperature sensor, which holds a temperature sensor including a sensor main body and an overhanging portion overhanging from a circumference of a base end portion of the sensor main body; is attached to an attachment hole penetrating in and out through a case housing a battery; and allows an end portion of the sensor main body to protrude into the case, comprising:

an abutting portion having a diameter larger than that of the attachment hole, and abutting against an outer surface of the case;

an insertion hole passing through the abutting portion, and having a diameter smaller than that of the overhanging portion so as to insert the sensor main body;

a holding tube communicated with the insertion hole, extending in a tube shape toward an outside of the case from the abutting portion, and opening at an end surface so as to insert the sensor main body to pass through the insertion hole from an open end surface, and to internally hold the overhanging portion;

a leg tube communicating with the insertion hole, extending in a tube shape toward an inside of the case from the abutting portion, and opening at an end so as to insert the sensor main body to pass through an end opening from the insertion hole, and to be able to insert into the attachment hole; and at least a pair of elastic claws elastically protruding from an outside surface of the leg tube, bending toward a tube inner portion of the leg tube when the elastic claws pass through the attachment hole, and restoring to its original state after passing through the attachment hole so as to sandwich the case between the abutting portion and the elastic claws, wherein the abutting portion includes at least a pair of ribs respectively positioned in two end portions in a diametrical direction of the abutting portion, protruding toward an outer surface of the case, and applying a force to the holding tube in a direction bending the abutting portion and narrowing the open end surface when the case is sandwiched between the pair of elastic claws and the ribs.

2. A clip for attaching a battery temperature sensor according to claim 1, wherein the holding tube includes at least a pair of slits opening in a direction orthogonal to an opposed direction of the pair of ribs, and extending up to a middle toward the holding tube from the open end surface.

3. A clip for attaching a battery temperature sensor according to claim 1, wherein an inner circumferential surface of the holding tube includes internal projections protruding toward a tube inner portion of the holding tube, and extending along an insertion direction of the temperature sensor.

4. A clip for attaching a battery temperature sensor according to claim 1, wherein an inner circumferential surface of the holding tube includes locking portions positioned in a middle in the insertion direction of the temperature sensor, protruding toward the tube inner portion of the holding tube, abutting against an outside surface of the overhanging portion, elastically bending in a direction expanding a diameter of the holding tube upon pressing by the outside surface, and restoring to its original state after the outside surface has passed through so as to sandwich the overhanging portion between the abutting portion positioned at a bottom of the holding tube and the locking portions.

* * * * *